United States Patent [19]

Patel

[11] Patent Number: 5,082,198
[45] Date of Patent: Jan. 21, 1992

[54] RECREATIONAL FLYING VEHICLE

[76] Inventor: Navnit R. Patel, 109 Arundel Rd. #4, Burlingame, Calif. 94010

[21] Appl. No.: 478,549

[22] Filed: Feb. 12, 1990

[51] Int. Cl.$^5$ ............................................. B64C 39/00
[52] U.S. Cl. .......................................... 244/2; 244/50; 434/37; 114/273
[58] Field of Search ................... 244/2, 45 R, 101, 50; 434/30, 37; 114/273

[56] References Cited

U.S. PATENT DOCUMENTS

| | | | |
|---|---|---|---|
| 1,825,363 | 9/1931 | Robertson | 434/37 |
| 1,910,655 | 5/1933 | Traver | 434/37 |
| 1,927,938 | 9/1933 | Huffman | 434/37 X |
| 2,493,482 | 1/1950 | Fish | 434/37 |
| 2,576,294 | 11/1951 | Geraci | 244/45 R |
| 3,991,487 | 11/1976 | Bede | 244/2 X |
| 4,417,706 | 11/1983 | Miller | 244/2 |

Primary Examiner—Joseph F. Peters, Jr.
Assistant Examiner—Carla Mattix
Attorney, Agent, or Firm—Christie, Parker & Hale

[57] ABSTRACT

A recreational vehicle combines a flying vehicle and a motorized surface vehicle, such as a boat, car, or truck or snowmobile. The flying vehicle is tethered to the surface vehicle by four rods, each of which is rotatably connected to the flying vehicle and surface vehicle, so that the angle of attack of the flying vehicle relative to the surface vehicle remains constant or decreases, depending only on altitude. On/off, throttling, and steering of the motorized surface vehicle are controlled by the pilot of the flying vehicle. The flaps of the flying vehicle are automatically lowered for landing to increase drag and lower the stall speed and raised following take-off to reduce drag. Ailerons are automatically controlled to roll the flying vehicle during turns.

11 Claims, 7 Drawing Sheets

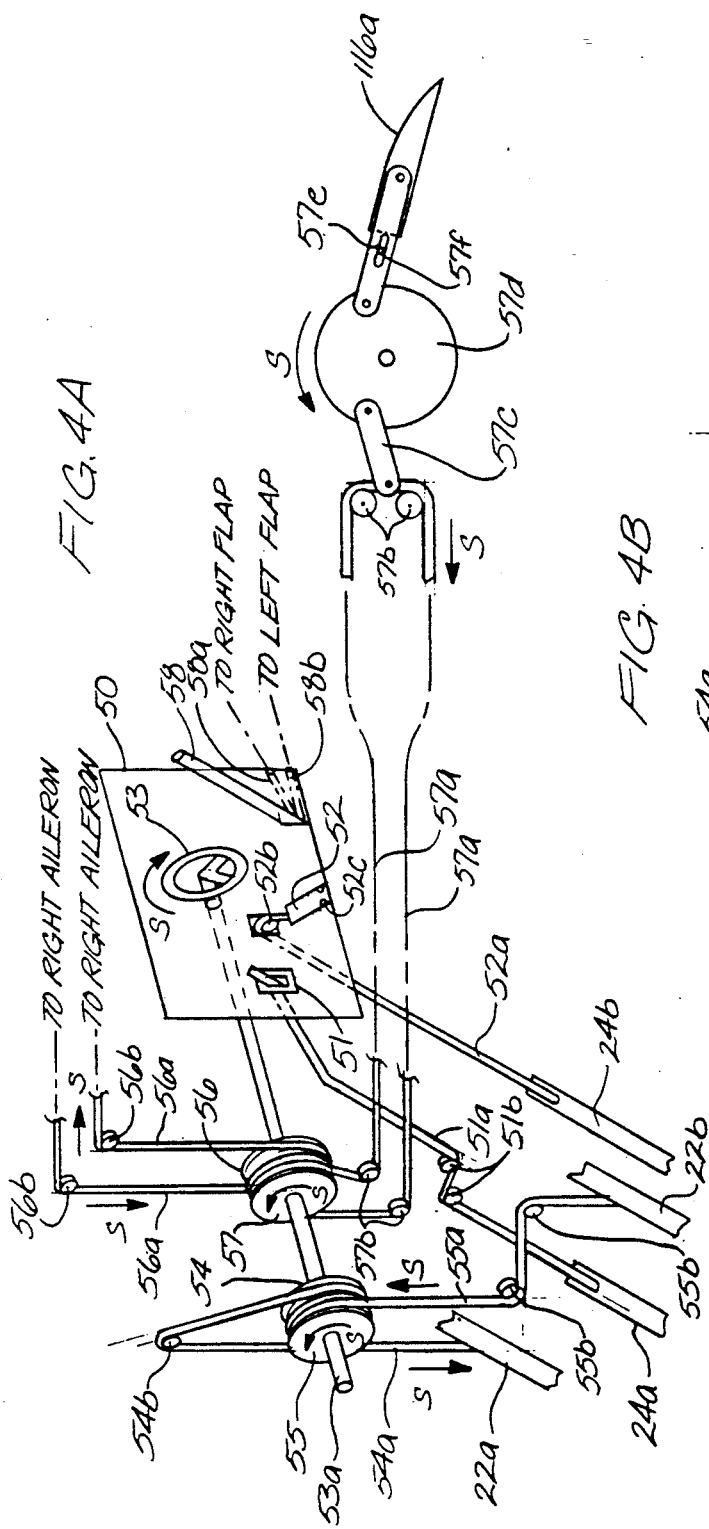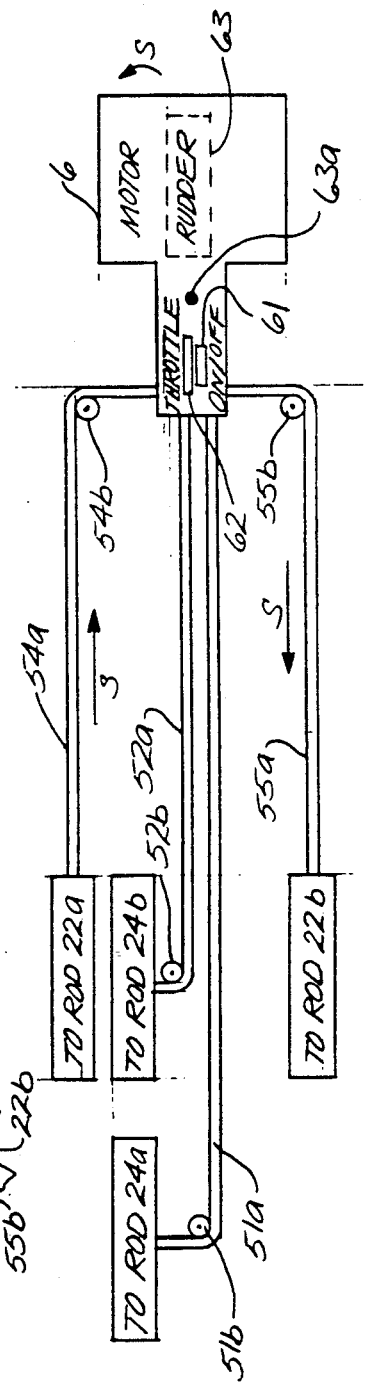

RECREATIONAL FLYING VEHICLE

BACKGROUND OF THE INVENTION

This invention relates to a recreational flying vehicle and, in particular, to an airborne vehicle which achieves flight from a motorized surface vehicle that tows or pushes the airborne vehicle.

Many people yearn to pilot an airplane, but several constraints, such as handling, safety and cost, prevent them from doing so. Several prior art vehicles attempt to make flight easy and safe by combining motorized surface vehicles with airborne vehicles. Examples are disclosed in U.S. Pat. No. 1,825,363 (Robertson); U.S. Pat. No. 3,522,785 (Thompson); U.S. Pat. No. 3,575,125 (Welsh et al.); U.S. Pat. No. 4,417,706 (Miller); and U.S. Pat. No. 3,991,487 (Bede). These patents all disclose airborne vehicles attached to surface vehicles in ways making them relatively difficult to control. In the vehicles described in most of these patents, the angle of attack of the wing can be varied at will and can inadvertently become highly negative, such as in FIG. 3 of Robertson. Uncontrolled variance in the angle of attack can cause loss of control and lead to an accident. While the Thompson patent attempts to control the angle of attack of a wing by pivotally mounting the wing with respect to the fuselage, this connection between the surface vehicle and the airborne vehicle does not solve the control problem. In sum, these patents describe vehicles with inadequate control of the wing because of failure to control the angle of attack of the wing as it rises with vehicle speed or descends as the vehicle slows.

The vehicles described in most of these patents take off and land from either the ground or water and, therefore, experience high relative velocities with respect to the take-off and landing surface.

Some of these patents also disclose various control systems for steering the flying vehicle, operating the flaps, and changing speed. Generally, either an operator of the surface vehicle steers or the pilot steers by controlling the flying vehicle. Where the operator of the surface vehicle steers, the pilot cannot experience a sensation of control; the pilot cannot even use the flying vehicle unless someone operates the surface vehicle.

SUMMARY OF THE INVENTION

This invention provides a fun, safe, and economical recreational flying vehicle powered by a surface vehicle. The invention provides a flying vehicle with good control in pitch, roll, and yaw. The invention provides good control of both the flying and the surface vehicles through a four-bar linkage. The four elements of the linkage are the wing of the flying vehicle, the surface vehicle and two links all connected to form a parallelogram. This system maintains the wing generally parallel to the surface vehicle regardless of the tilt of the parallelogram, providing positive control of the wing angle of attack at all wing altitudes.

The invention also provides a flying vehicle with a controlled angle of attack, regardless of altitude and speed, while enabling the pilot to control speed, steering, and take-off and landing. In addition, the invention provides a recreational vehicle with a compact structure that is easy to maneuver and store when the flying vehicle is on the surface. The flying vehicle takes off and lands on the surface vehicle, which moves with the flying vehicle, eliminating potentially dangerous relative velocities between the two.

In a detailed form of the invention, the flying vehicle connects to a surface vehicle through parallel linkage means of four arms, each of the same length and each pivotally attached to the surface vehicle and flying vehicle so that the angle of attack of the wing relative to the surface vehicle remains constant regardless of the altitude and speed of the flying vehicle, in a parallelogram. The arrangement is still a four-bar linkage that uses the wing and the surface vehicle as opposing "links" in the parallelogram. To reduce the wing span of the flying vehicle, the linkage arms may be extended above and beyond the flying vehicle to accommodate additional wings of shorter wing spans. The pilot controls the speed and direction of the surface vehicle from the flying vehicle so that no one else is required to operate the recreational vehicle.

Instead of a fixed angle of attack, the recreational vehicle can have an automatic angle of attack setting system in which the linking arms are modified so that the angle of attack changes with altitude in such a way as to provide stability and reduce drag.

The linking arms attach to the front portion of the surface vehicle, in the preferred embodiment, so that when the flying vehicle is being pulled, the flying vehicle can land on the surface vehicle. When the prime mover is a boat, the arms may connect to the front end of the boat so that the flying vehicle will tend to pull the front up to reduce wave drag on the boat. If the surface vehicle pushes the flying vehicle, the linking arms attach at the rear of the surface vehicle, allowing the flying vehicle to land at the forward end of the surface vehicle. A resilient connection, as by a spring or elastic band, can link the front of the surface vehicle to the flying vehicle and provide greater stability; such a link also transfers some of the weight of the surface vehicle to the flying vehicle and reduces water drag.

The recreational vehicle also has an automatic flap operating mechanism which operate the flaps at proper times during take-offs and landings. This arrangement automatically limits the height that the flying vehicle will rise above the surface vehicle.

The recreational vehicle also has an aileron operating mechanism which operates the ailerons during a coordinated turn to properly bank the flying vehicle and the surface vehicle to ensure stability.

Two mechanical means of reducing the apparent wing loading on the flying vehicle at low speeds are provided. This feature reduces the stall speed of the flying vehicle and allows it to take-off and land smoothly on the surface vehicle. This is achieved by installing compression struts between the linkage arms and the surface vehicle and/or using a "fishpole" suspension system which uses the bending forces in a flexible pole to generate a lifting force on the flying vehicle when it is close to the surface vehicle at low speeds.

A feature of the present invention permits the vehicle to operate in choppy waters. It does this by mounting the flying vehicle to the surface vehicle through a pivotal connection and a stabilizer or elevator air foil attached to the flying vehicle through a lever arm. In a particular form, the stabilizer extends aft from the pivotal connection beneath the flying vehicle. When surface vehicle pitches up, the stabilizer will experience an upward force that through the lever arm rotates the flying vehicle with respect to the surface vehicle, keeping the flying vehicle horizontal relative to the mean surface of the water. When the surface vehicle pitches down, the stabilizer experiences a downward force that rotates the flying vehicle downward, maintaining the horizontal orientation.

The above features and advantages will become more evident with reference to the detailed description, drawings, and claims.

BRIEF DESCRIPTION OF THE DRAWINGS

FIG. 4A is a partial schematic view of a portion of the preferred control system that is on-board the flying vehicle;

FIG. 4B is a partial schematic view of a portion of the control system that i on-board a boat used as a prime mover;

DETAILED DESCRIPTION

Figure 1:
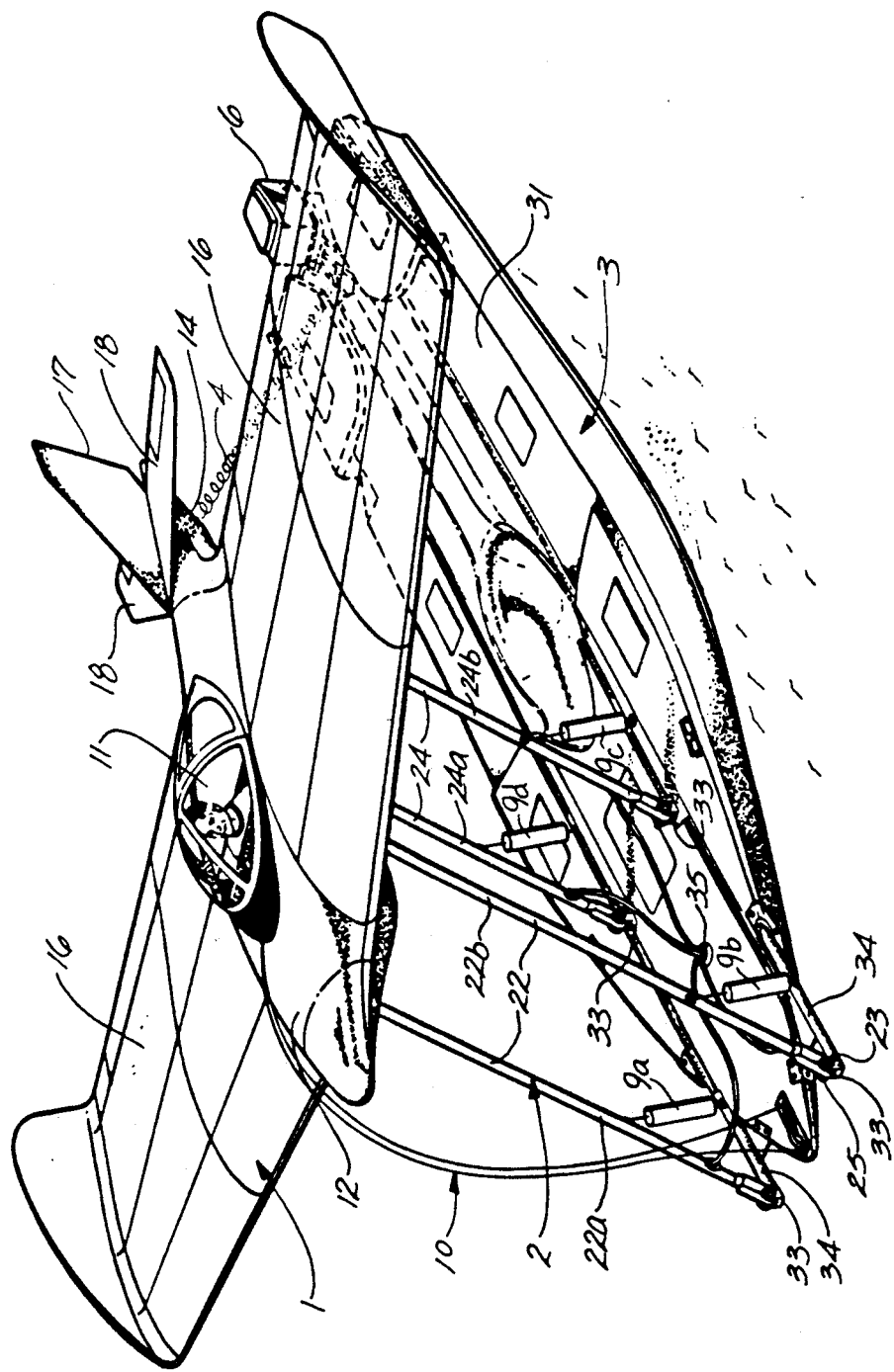
FIG. 1 is a perspective view of the preferred form of the recreational vehicle of the invention showing the flying vehicle in flight.

As shown in FIG. 1, the invention is an improved recreational vehicle in which a flying vehicle 1 is tethered by a linkage mechanism 2 (in the form of four parallel arms) to a motorized vehicle (surface vehicle) 3. In this instance, the surface vehicle is a boat with an outboard motor 6. The recreational vehicle is fully controllable by just one person (pilot) sitting in a cockpit 11 of the flying vehicle 1. The boat need not be manned. Generally, flying vehicle 1 is aerodynamically constructed in a manner well known in the art.

Where linkage mechanism 2 attaches to the front of boat 3, the apparent weight of the boat on the water is effectively reduced by the lift of the flying vehicle, thereby reducing wave drag on the boat.

Figure 2:
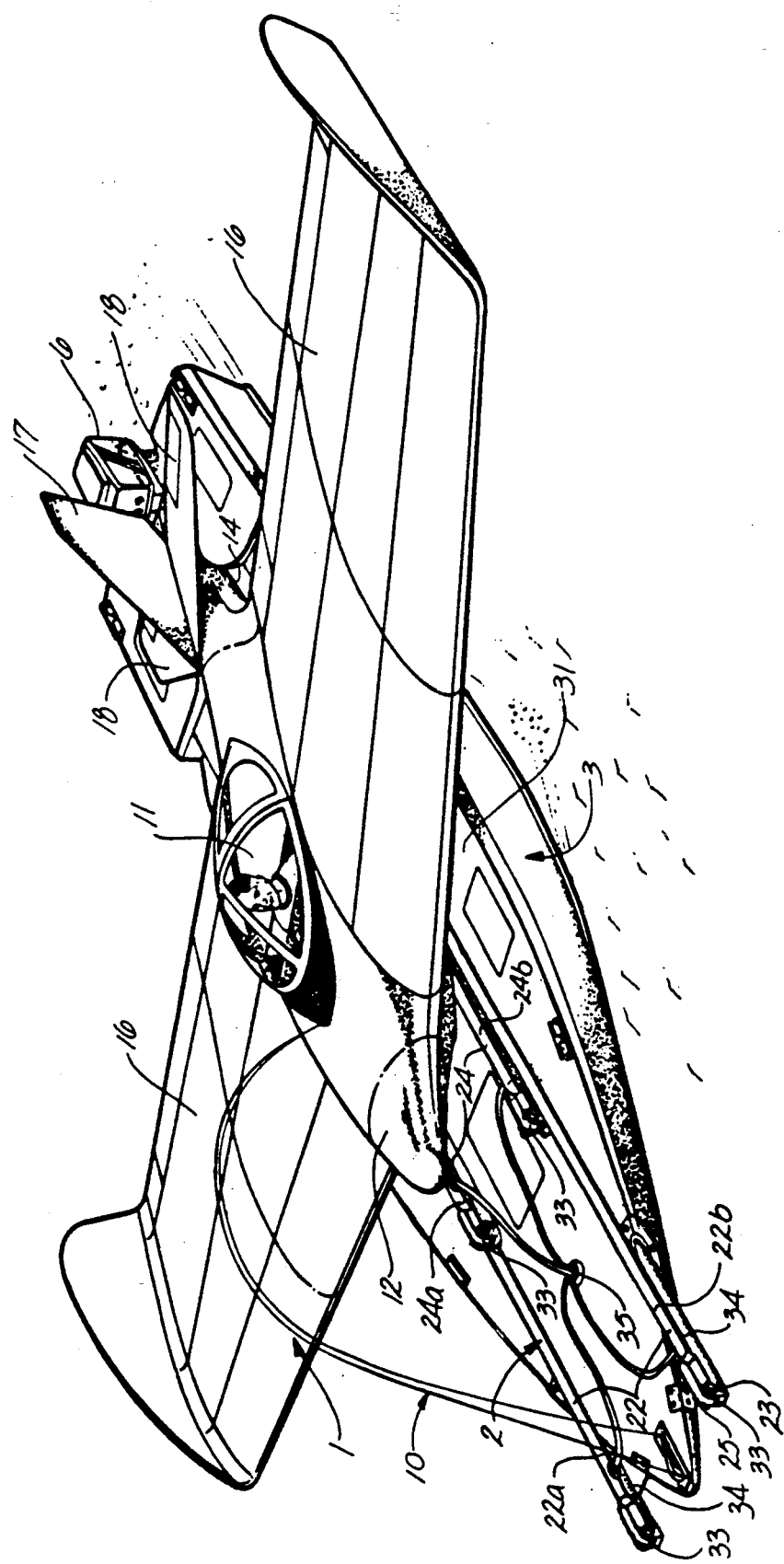
FIG. 2 is a perspective view of the recreational vehicle of FIG. 1 showing the flying vehicle at rest on the boat.

To operate the recreational vehicle, the pilot climbs into cockpit 11 while flying vehicle 1 rests on boat 3, as shown in FIG. 2. The pilot then controls the recreational vehicle as if it were only a boat. The pilot starts up outboard motor 6 mounted on the boat 3, accelerates and decelerates, turns starboard (right) or port (left), and stops (by idling or cutting off the motor, as with a conventional boat). When the pilot accelerates the boat to a sufficient speed to lift flying vehicle 1, linkage mechanism 2 allows the flying vehicle to move upward along an arcuate path. The pilot controls the height of the flying vehicle 1 by controlling the speed of the boat, and turns the flying vehicle by turning boat 3. With the structure described, a reasonable stall speed should be 25 mph.

To further decrease the stall speed for a given shape and size of a given wing 16, compression struts 9a, 9b, 9c and 9d as shown in FIG. 1 can be used to reduce the apparent loading on wing 16 at low speeds when flying vehicle 1 is close to the surface vehicle 3. The compression struts 9a, 9b, 9c and 9d consist of compression springs and/or hydraulic rams or a combination thereof, installed between the linkage arms 22a, 22b, 24a, 24b and surface vehicle 3 in such a way that when flying vehicle 1 is close to surface vehicle, the compression struts produce lifting forces on the four linkage arms 22a, 22b, 24a, 24b which transmit this lifting forces to wing 16, thereby reducing the apparent wing loading.

A fishpole suspension system 10 shown in FIG. 1 and FIG. 2 can also be used to reduce the apparent loading on wing 16 at low speeds. The fishpole suspension system 10 consists of a flexible glass and carbon fiber pole with its base rigidly attached to the bow of the surface vehicle 3 and the tip attached to the flying vehicle 1. At low speeds when flying vehicle 1 is still close to the surface vehicle 3, the bending forces in the fishpole suspension system 10 will tend to lift flying vehicle 1 off the surface vehicle 3 at a much lower speed depending on the lifting forces generated by the fishpole suspension system 10. Only one pole is shown for clarity but several of these poles may be similarly used as required.

Flying vehicle 1 has a fuselage 12, a tail section 14, wings 16, and cockpit 11. Though the tail section improves stability of vehicle 1, it is not essential to provide primary vehicle control, as is the case with conventional airplanes. The boat has a hull 31 that supports motor 6. Linkage mechanism 2 is formed primarily by four parallel support bars or arms 22a, 22b, 24a, 24b, organized as a forward pair 22 and an aft pair 24.

Linkage means or mechanism 2 stabilizer flying vehicle 1 and boat 3 (when the flying vehicle is in flight) by preventing unwanted yawing, pitching, or rolling of the flying vehicle with respect to the boat. In the first embodiment, arms 22, 24 are all the same length, and the distance from the forward arms 22 to the aft arms 24 is the same at the point of attachment on the boat as on the flying vehicle, i.e., the arms are always parallel regardless of their angle with respect to the horizontal. Because the arms are always parallel, the angle of attack relative to the boat will remain constant, regardless of altitude and speed. This constant angle of attack is in contrast to a conventional plane and prior art vehicles having a flying vehicle coupled to a surface vehicle, in which the angle of attack can vary. The angle of attack of the wing of flying vehicle 1 relative to the airstream is preferably positive 8° to 10°.

Each arm of the arm pairs 22 and 24 attach at one end to the boat 3 and at the other end to the flying vehicle 1 for rotation about a horizontal axis perpendicular to the lengthwise axis of the boat and flying vehicle, i.e., parallel to the pitch axis of the flying vehicle. Four mounting brackets 33, each having two aligned eyelets, attach to boat 3. Each of the arms of arm pairs 22 and 24 has an eyelet near the end, and is fastened to the boat by threading a bolt 23 through the eyelets of each mounting bracket 33 and the eyelet of the associated rod. A nut 25 fastens the bolt 23. Each arm of arm pair 22 and 24 similarly attach to the fuselage 12 using four brackets 133 (see FIG. 3).

In the preferred embodiment, arm pairs 22 and 24 and hull 31 are properly dimensioned relative to each other so that flying vehicle 1 will land on and take off from hull 31, as shown in FIG. 2. As best shown in FIG. 1, it is advantageous to build the deck surface of hull 31 with a shape that smoothly receives flying vehicle 1. In addition, so that flying vehicle 1 flies higher, yet still lands on boat 3 (for a given length boat), the front pair of mounting brackets 33 are formed integrally with supporting arms 34, which extend forward from the hull 31. This extension forward of the fastening point of the front rods 22 also increases the length of the moment arm from the boat's center of gravity. Therefore, for a given force of lift acting on the flying vehicle 1, the bow of boat 3 will be pulled further out of the water to cut down even more on wave drag. To further reduce wave drag, a fixed wing (not shown) could be mounted on the hull 31 near or at the rear of the boat 3. In addition, a spring or elastic band 4, shown in FIGS. 1 and 6, transfers some of the weight of the boat to the flying vehicle to reduce wave drag and increase stability.

As noted, the pilot operates the recreational vehicle from cockpit 11. With reference to FIGS. 4A and 4B, engine 6 turns on and off through a start/stop switch 51 on an instrument panel 50 in the cockpit 11. Any suitable method can be used to link switch 51 with an on-/off mechanism 61 of the motor 6. Such methods include cables, electronic wiring, hydraulic mechanisms, or a combination thereof. In the illustrated embodiment, a cable 51a is used. Cable 51a runs from the on/off switch 51, around pulleys 51b, through the right rear rod 24a, into hull 31 via a hole 35 (FIG. 1), around another pulley 51b, and to the on/off mechanism 61 of motor 6. The type of on/off switch 51 used, and the way in which the cable 51a is connected to the on/off mechanism 61 of motor 6, may differ, depending on the type of on/off mechanism 61 that the motor 6 has. For example, in the illustrated embodiment, on/off mechanism 61 represents a toggle switch biased into the "off" position and movable by pulling it into the "on" position. If there are separate on and off mechanisms, such as a pull cord and a gas cutoff switch, on motor 6, then separate on and off switches could be provided on panel 50, along with separate cables for each switch. Cable 51a is fastened to the on/off mechanism 61 and switch 51 by any suitable means, such as welding, tying, or press-fitting. The number of pulleys 51b (if any) will vary with the number of directional changes that cable 51a must undergo to reach on/off mechanism 61 from switch 51.

A throttle pedal (or switch) 52 is linked with a throttle mechanism 62 of motor 6 through a cable 52a supported by pulleys 52b and passing through left rear rod 24b. Cable 52a is attached to the top of the pedal 52 and to the throttle mechanism 62. Throttle mechanism 62 is biased into an idle mode, and increases as the pulling force exerted by cable 52a increases in response to pivoting of pedal 52 about an axis 52c.

Instrument panel 50 also has a steering wheel 53 for turning the boat 3 and thus the entire vehicle. The arrows S in FIGS. 4A and 4B show a right turn. A suitable mechanism to turn the boat 3 to the right includes a first set of pulleys 54, 55 and two cables 54a, 55a. Pulleys 54, 55 are fixedly mounted around a steering wheel column 53a. Cable 54a has one end attached to pulley 54 and the other end attached to motor 6, and cable 55a has one end attached to pulley 55 and the other end attached to motor 6. Cables 54a and 55a are supported by pulleys 54b and 55b, and pass through the right front rod 22a and left front rod 22b, respectively. When wheel 53 is rotated to the right (clockwise), pulleys 54 and 55 rotate clockwise, causing cables 54a and 55a to turn motor 6 about a fixed pivot point 63a. Thus, a rudder 63 of motor 6 rotates counterclockwise (in FIG. 4B) to turn the boat starboard. The motion of wheel 53, pulleys 54, 55, cables 54a, 55a, and rudder 63 is shown by the arrow "S." If desired, one long cable could replace the two cables 54a, 55a.

To turn port, wheel 53 is rotated counterclockwise, causing pulleys 54, 55, cables 54a, 54b, and rudder 63 to move in directions opposite to the direction "S."

To provide greater stabilization for the flying vehicle and boat 3, flying vehicle 1 is equipped with an automatic aileron operating mechanism to roll the flying vehicle and boat during turns. With continued reference to FIG. 4A, a second set of pulleys 56, 57 attach to steering column 53a. Pulleys 56, 57 have respective cables 56a, 57a attached to them. Cable 57a is supported by pulleys 57b and is attached to a first lever arm 57c of a bell crank assembly. The first lever arm is attached to a rotatable wheel 57d, and a second lever arm 57e is attached to wheel 57d and a side of the left aileron 116a. (To increase the force that pulls the ailerons 116a down or up, another wheel and lever arm 57e are positioned on the other side of the aileron, and the additional wheel is connected to the wheel 57d to rotate therewith.) When steering wheel 53 is rotated in the direction "S," pulleys 56, 57, cables 56a, 57a, and rotatable wheel 57d move in the direction "S," causing the left aileron 116a to move downward due to the second lever arm 57e which rotates about a fixed pivot point 57f positioned in a slot (unnumbered) in the lever arm 57e. Cable 56a is attached to a right aileron 116b in the same way, i.e., via a bell crank assembly, except that the cable 56a is attached to the first lever arm so that it pulls the arm upward when the cable moves in the direction "S," thus pulling right aileron 116b up. This action causes the left side of the flying vehicle 1 to lift and the right side to drop, thus banking flying vehicle 1 and boat 3 to the right. The sharper the turn is, the greater the banking is, due to the greater rotation of wheel 53, and thus the greater the movement of the ailerons 116a, 116b. This automatic aileron operating mechanism thus eliminates or minimizes "side slipping" (due to centrifugal force) during turns. During a left turn, the automatic aileron control mechanism raises left aileron 116a and lowers right aileron 116b to bank the flying vehicle 1 to the left.

The ailerons may incorporate "differential" control.

Figure 3:
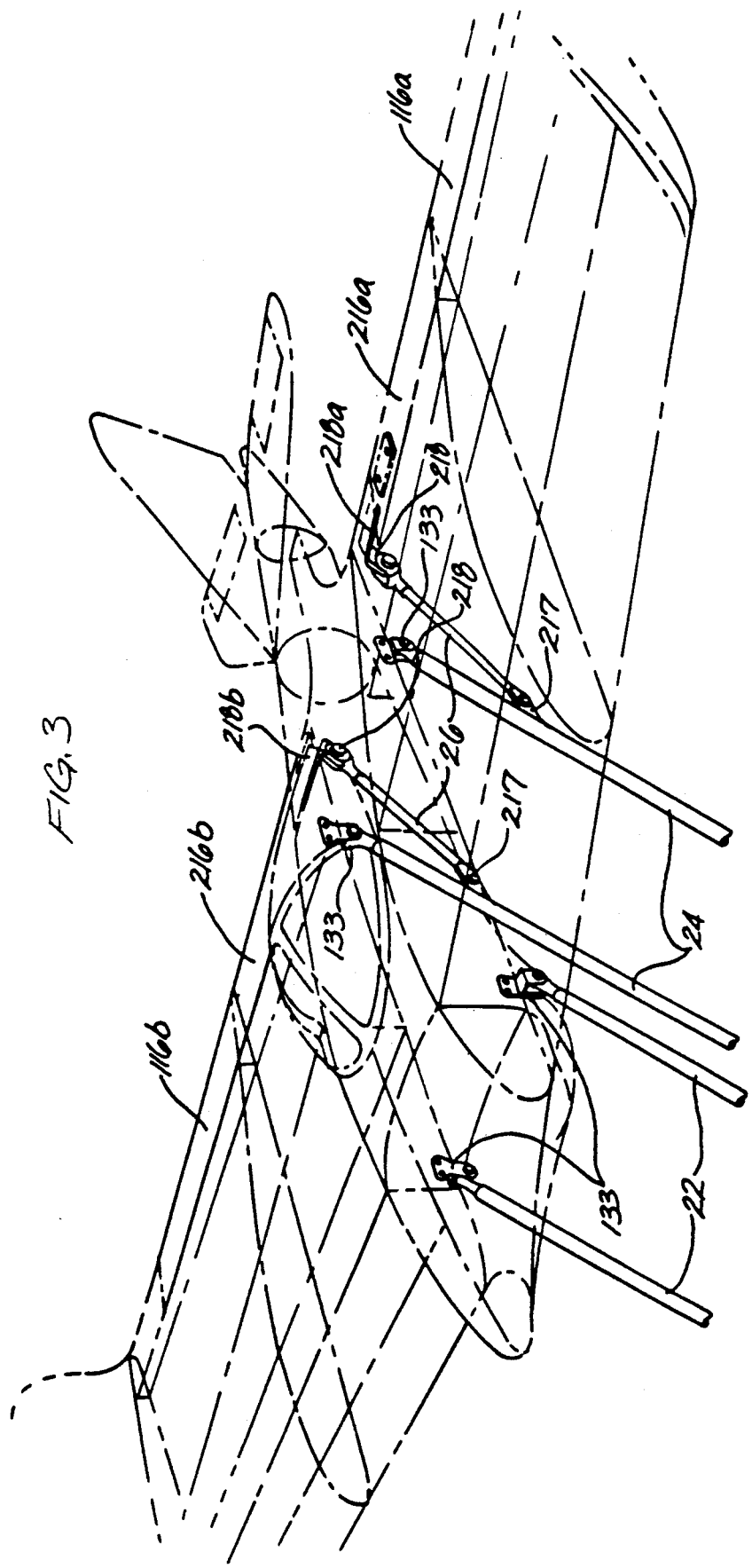
FIG. 3 is a perspective view of the skeleton of the flying vehicle.

An automatic flap control to lower the flaps 216a, 216b automatically during take-off and landing can also be provided, as shown in FIG. 3. A suitable system includes linking arms 26 attached at one end to the rear linking rods 24 via mounting brackets 217 similar to the brackets 133. At the other end, the linking arms 26 are attached to a pair of mounting brackets 218 that have respective flanges 218a, 218b. These flanges are each attached to a respective flap 216a, 216b.

When flying vehicle 1 is about to take off, each arm 26 is in a position at a fixed angle with respect to the associated rod 24. This position pulls down each flap 216a, 216b via mounting brackets 218 and their flanges 218a, 218b. As flying vehicle 1 elevates, each rod 24 rotates on bracket 133 and the associated arm 26 moves each flap 216a, 216b up towards its position flush with wing 16. To aid this movement, the flaps can be biased into the flush position. Upon landing, each bracket 133 rotates and the associated arm 26 and the fixed angle of the rod and the linking arm pulls each flap down.

When flying vehicle 1 has gained sufficient speed and has elevated to a predetermined height above surface vehicle 3 where flaps 216a, 216b are flush with wing 16, any further increase in speed of the recreational vehicle will have a tendency to further elevate flying vehicle 1 above surface vehicle 3, putting wing 16 in a 'reflex mode' where flaps 216a, 216b are raised above wing 16. This configuration will limit the lift produced by wing 16 and therefore keep flying vehicle 1 at an equilibrium height above surface vehicle 3. The equilibrium height that flying vehicle 1 reaches above surface vehicle 3 is predetermined by the initial angle to which flaps 216a, 216b are lowered and set while flying vehicle 1 is resting on surface vehicle 3.

During take-off, the flaps increase the lift coefficient of the wing, reducing the stall speed of the flying vehicle and allowing it to fly at a much slower speed than it would otherwise. During landing, the flaps are fully lowered to further increase drag, causing flying vehicle 1 to slow down, descend, and land smoothly on the boat.

In addition to this automatic flap control, a manual flap control can be added. A suitable manual control is operable using a lever 58 on the instrument panel 50, with two cables 58a, 58b attached to the lever. One of the cables runs over pulleys to the left flap 216a, and the other cable runs over pulleys to the right flap 216b. Cables 58a, 58b can be directly attached (or attached via bell cranks or the like) to the flaps 216a, 216b so that pulling on the stick 59 will pull down the flaps.

To slow down or stop the recreational vehicle, coasting or reverse throttle are used, as boats typically do not have a braking system.

To minimize yaw, pitch, and roll deviations of the recreational vehicle, the surface vehicle (boat 3) can have floats or hydrofoils, and the flying vehicle 1 can have airfoils. For example, boat 3 could have two floats, attached to the starboard and port sides, and extending parallel to the length direction of the boat. Flying vehicle 1 also has vertical and horizontal stabilizers 17, 18, respectively, located at tail section 14.

With reference again to FIG. 1, for side-to-side stability, wings 16 can have a dihedral canting of about 10 to 15 degrees, so that the wings slope upwardly in the outboard direction (away from the fuselage 12).

It may be useful to include an engine temperature gauge, fuel gauge, tachometer, gear lever, air speed indicator, roll and bank indicator, altimeter, and two-way radio on panel 50, as in conventional boats and aircraft. Where necessary, wires can run through the linking rods 22 or 24, as in the case of the cables.

In the invention as thus far described, the angle of attack of wing 16 is constant with height and speed. When the angle of attack is fixed, the amount of lift will increase with speed. To provide greater stability in heave, the angle of attack can automatically be varied with altitude by varying the following parameters: L(22) and L(24), i.e., the dimensional relationships between the lengths of the front and rear rods 22, 24, respectively; H(F) and H(R), i.e., the respective heights of the points (F and R) of pivotable attachment of the front and rear rods 22, 24 to boat 3; and D(F to R) and D($F_i$ to $R_i$), i.e., the respective distances between the points (F and R) of attachment of the front and rear rods 22, 24 to boat 3 and the points ($F_i$ and $R_i$) of attachment of front and rear rods 22, 24 to the plane 1. These exemplary configurations are shown in FIGS. 5A, 5B and 5C, in which the angle of attack decreases automatically with altitude.

Figure 5A:
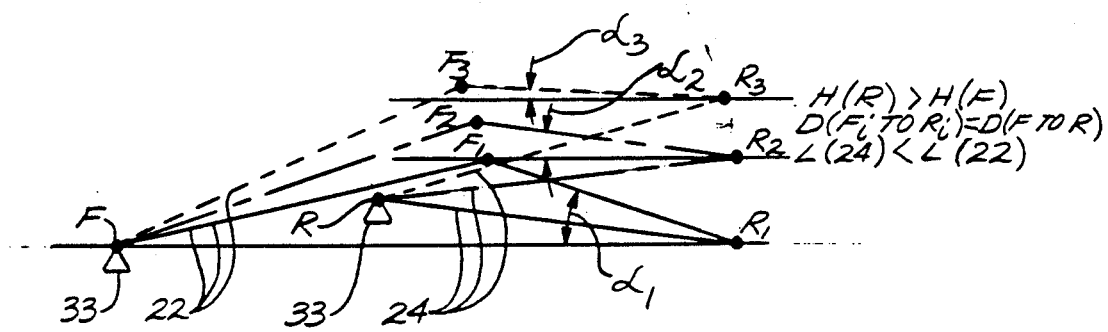
FIG. 5A, 5B, and 5C are side view diagrams of respective examples of an automatic angle of attack control system.

FIG. 5A shows the case where:
H(R) > H(F)
D(F to R) = D($F_i$ to $R_i$)
L(24) < L(22)

Figure 5B:
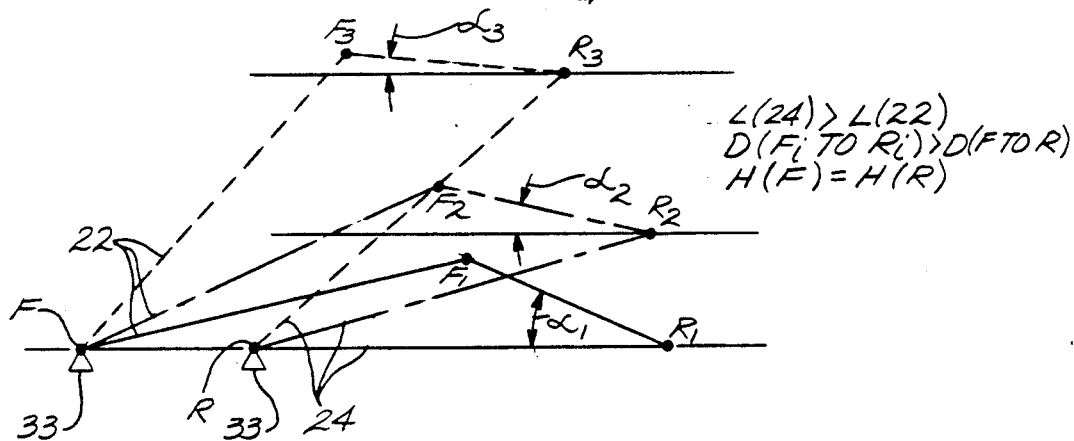

FIG. 5B shows the case where:
H(R) = H(F)
D(F to R) < D($F_i$ to $R_i$)
L(24) > L(22)

Figure 5C:
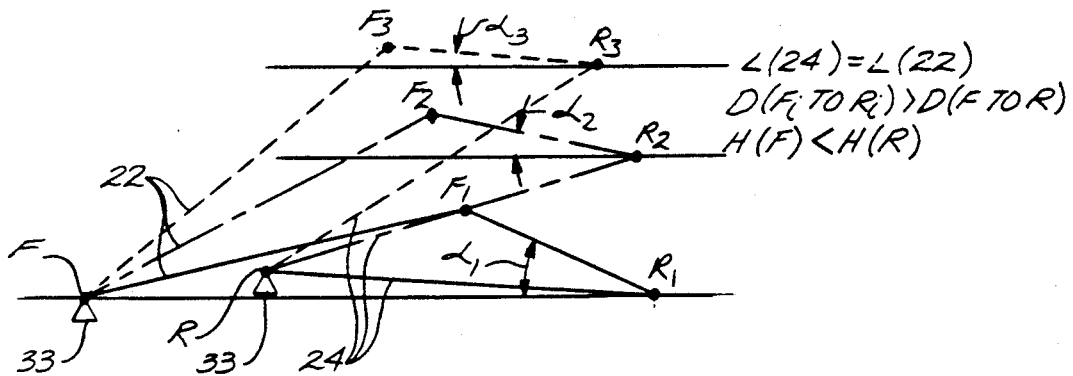

FIG. 5C shows the case where:
H(R) > H(F)
D(F to R) < D($F_i$ to $R_i$)
L(24) = L(22)

In all three cases, $\alpha_1 > \alpha_2 > \alpha_3$, where $h_1 < h_2 < h_3$ (where $\alpha$ is the angle of attack, and h is the altitude of the flying vehicle taken from a reference point). These configurations automatically correct for spurious inputs due to heaving and changes in angle of attack due to surface irregularities encountered by the surface vehicle 3, e.g., waves (or bumps on hard surfaces).

Figure 6:
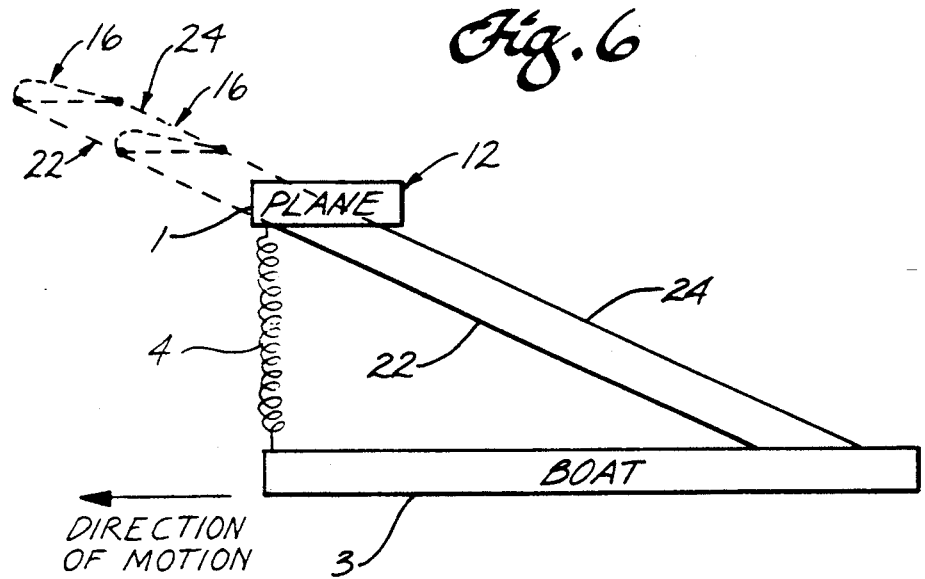
FIG. 6 is a side view, schematic diagram of an alternative embodiment of the recreational vehicle in which linking rods between the surface vehicle and flying vehicle are in compression.

In the embodiments of the invention described so far, rods 22, 24 are in tension, because the flying vehicle is being pulled by them. It is also possible to arrange the linkage mechanism 2 so that rods 22, 24 push flying vehicle 1 and, accordingly, are in compression. This arrangement is shown in FIG. 6. Except as shown in this figure, all of the elements are the same as in the previous embodiment and thus are given the same numbers. Four rods 22, 24 are attached at the rear of the hull 31. Due to the compressive forces in the bars, the apparent weight of flying vehicle 1 is reduced. That is, for a given weight of flying vehicle 1, and a given speed, the flying vehicle does not need as much lift to achieve a given height as compared with the case where the rods are in tension.

In addition to improved efficiency of lift, forward visibility is improved because the pilot is at the forward end of boat 3, and rods 22, 24 are located to the rear of the plane. This creates a truer sensation of flight. As previously pointed out, spring or elastic band 4 couples the front of the boat to the flying vehicle and because of this increases stability of the flying vehicle and reduces wave drag, improving efficiency.

With reference again to FIG. 6, rods 22 and 24 may be extended above and beyond fuselage 12 of flying vehicle 1 to pivotally attach additional wing(s) 16 to rods 22 and 24. This feature will facilitate the use of smaller wing spans to produce the same amount of lift as one wing with a long span.

Figure 7:
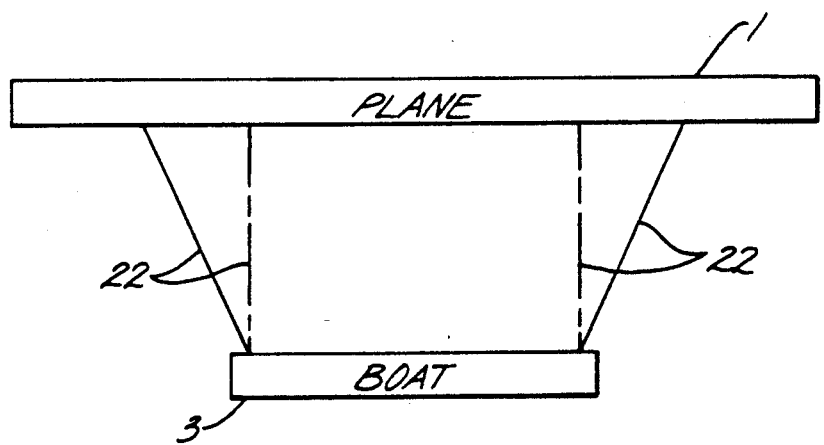
FIG. 7 is a front view, schematic diagram of an alternate embodiment in which the arrangement of the linking rods is changed.

In any of the above embodiments, for additional stability against yaw and side-to-side motion of flying vehicle 1 with respect to boat 3, the front and rear rods 22, 24 are displaced outboard at their points of attachment to the flying vehicle. This arrangement is in contrast to the case where two starboard rods 22a, 24a and two port rods 22b, 24b lie in parallel, vertical planes. FIG. 7 is a schematic front view of the recreational vehicle, showing this modification to rods 22, 24 with a solid line. The case where the rods 22, 24 lie in a vertical plane is shown with a dashed line.

Figure 8:
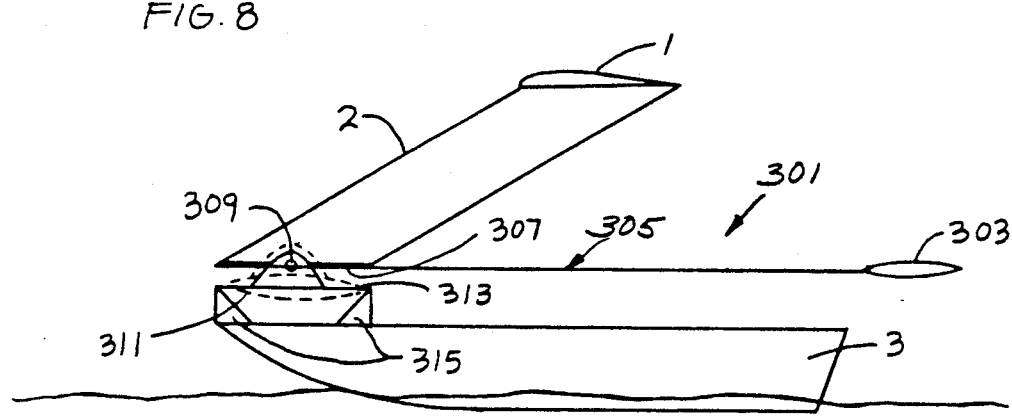
FIG. 8 is a side, elevational view showing a stabilizing feature of the invention.
Figure 9:
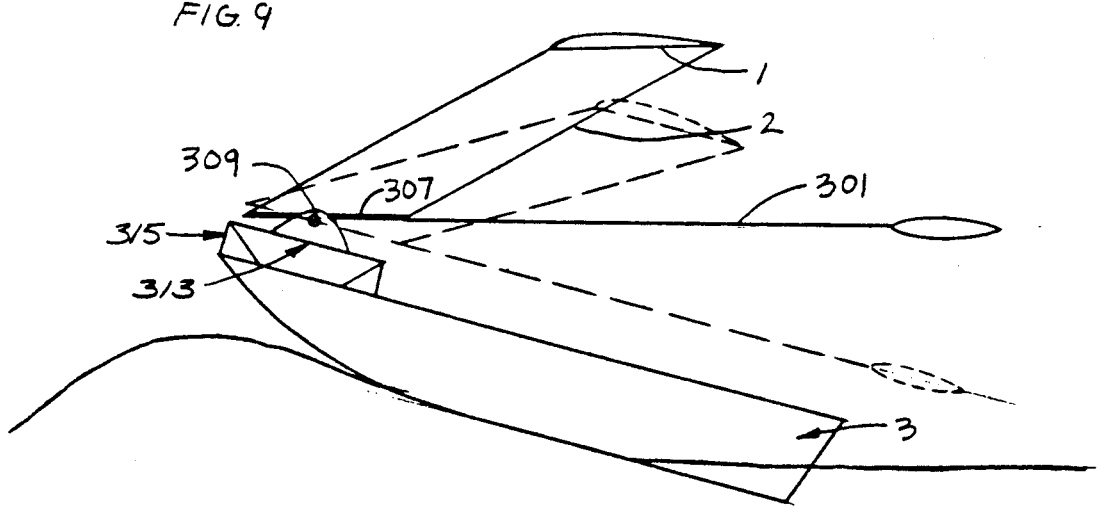
FIGS. 9 and 10 show the stabilizing feature of FIG. 8 in operation.
Figure 10:
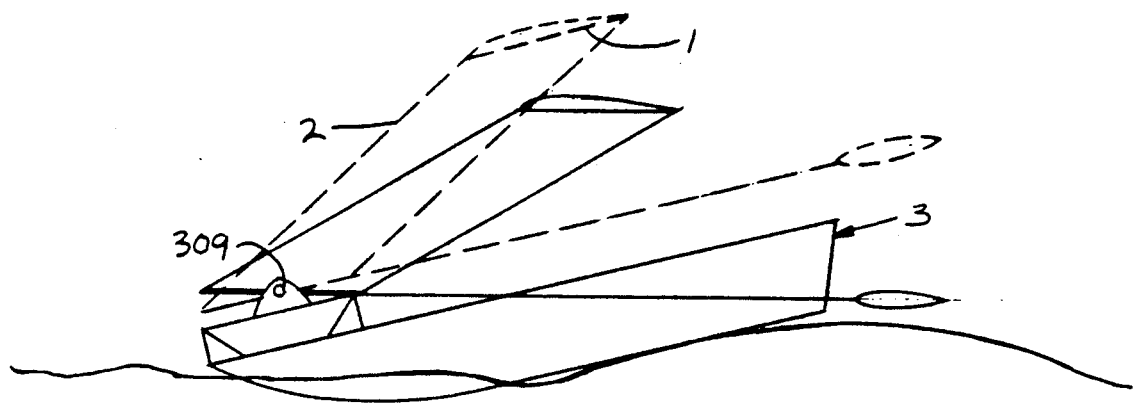

FIGS. 8 through 10 show an additional and important feature of the present invention: a means to keep the flying vehicle relatively horizontal even though the surface vehicle is undergoing pitch, as in water that is choppy or that has swells. The surface vehicle and the flying vehicle are the same as previously described and will be identified as such, boat 3 and wing 1. A stabilizer assembly 301 has a stabilizer or elevator 33 in the form of an air foil. A lever arm 305 attaches to the stabilizer and to a mounting platform 307. The mounting platform attaches to boat 3 through a pivot 309 and a suspension assembly 311. The stabilizer extends aft from the bow of the boat and below wing 1. Mounting platform 307 mounts four bar linkage 2. Because the mounting platform can pivot, so can the linkage and wing. As shown in FIGS. 9 and 10, when boat 3 experiences pitch the stabilizer tends to keep the wing horizontal. It does this because of a moment developed by the stabilizer that acts counter to the direction of boat pitching. When boat 3 pitches up, stabilizer 301 tends to rotate down, clockwise in the Figures. But when the stabilizer rotates slightly down, its angle of attack changes and an upward force results that through the lever arm applies a moment to platform 307 that maintains the platform and the wing horizontal. When the stabilizer rotates slightly up, its angle of attack again changes but in the opposite direction, and a downward force results that through the lever arm results in a moment that again maintains the horizontal orientation of the wing.

In greater detail, suspension 311 includes a leaf spring 313 that attaches at its ends to uprights 315. Uprights 315 attach to the bow of boat 3. Arm 301 is attached to platform 307 which in turn is mounted on to leaf spring 313 through pivot mount 309. The leaf spring lowers the frequency of pitch forces acting on the mount through the spring. If desired, shock absorbers could be used to reduce the energy of pitch that the platform sees.

The recreational vehicle is operable on any relatively smooth surface, including water, ice or snow, land, and a mountain or ski slope. Therefore, flying vehicle 1 can be powered by a snowmobile or other ice or snow vehicle, by a car or truck on land, and by a gravity-powered vehicle on a ski slope. In the case where flying vehicle 1 rests on (i.e., takes off from and lands on) the surface vehicle 3, the bed of vehicle 3 should be shaped to accommodate the flying vehicle. In the case where the flying vehicle is pushed or pulled along the smooth surface, the flying vehicle is preferably equipped with appropriate "landing gear", such as wheels for land, floats or pontoons for water, and skis for ice or snow. Note that for the gravity-powered vehicle, the preferred surface vehicle is a substantially flatbed, railroad-car-like vehicle mounted on railroad tracks. The railroad car has friction brakes, operated from the instrument panel in the flying vehicle by a cable linkage comparable to the cable linkages used in the boat embodiment. In this case, unlike the other embodiments, the recreational vehicle must follow the tracks, and thus a steering mechanism would not be necessary. Note also that for the car or truck and snowmobile embodiments, the control mechanisms, including their linkage to the instrument panel in the plane, are the same, or substantially the same, as in the boat embodiment.

The above embodiments are intended as illustrative examples of the invention. The spirit and scope of the appended claims should not necessarily be limited to the disclosed embodiments.

I claim:

1. A recreational vehicle comprising:
    a surface vehicle having drive means for propulsion along a generally flat surface;
    a flying vehicle including a wing having plural flaps; and
    linkage means for coupling the flying vehicle to the surface vehicle and for automatically and simultaneously adjustably limiting an angle of attack of the wing and an angle of flap deflection, the linkage means comprising
    first and second front support arms each having bottom ends pivotally mounted on the surface vehicle for pivoting on a first horizontal axis, each front support arm having a top end pivotally mounted on the flying vehicle for pivoting on a second horizontal axis;
    first and second rear support arms each having bottom ends pivotally mounted to the surface vehicle aft of the first and second front support arms for pivoting on a third horizontal axis, each rear support arm having a top end pivotally mounted on the flying vehicle for pivoting on a fourth horizontal axis;
    first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;
    further including fishpole suspension means for reducing the apparent wing loading on the flying vehicle at low speeds comprising a resilient glass and carbon fiber pole having a base attached to a bow of the surface vehicle and a tip attached to the flying vehicle so that when the flying vehicle is close to the surface vehicle the bending forces in the flexible pole produces a lifting force on the flying vehicle, thereby reducing the apparent wing loading.

2. A recreational vehicle comprising:
    a surface vehicle having drive means for propulsion along a generally flat surface;
    a flying vehicle including a wing having plural flaps; and
    linkage means for coupling the flying vehicle to the surface vehicle and for automatically and simultaneously adjustably limiting an angle of attack of the wing and an angle of flap deflection, the linkage means comprising
    first and second front support arms each having bottom ends pivotally mounted on the surface vehicle for pivoting on a first horizontal axis, each front support arm having a top end pivotally mounted on the flying vehicle for pivoting on a second horizontal axis;
    first and second rear support arms each having bottom ends pivotally mounted to the surface vehicle aft of the first and second front support arms for pivoting on a third horizontal axis, each rear support arm having a top end pivotally mounted on the flying vehicle for pivoting on a fourth horizontal axis;
    first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps.

3. A recreational vehicle comprising:
    a surface vehicle having drive means for propulsion along a generally flat surface;
    a flying vehicle including a wing having plural flaps; and linkage means for coupling the flying vehicle to the surface vehicle and for automatically and simultaneously adjustably limiting an angle of attack of the wing and an angle of flap deflection, the linkage means comprising first and second front support arms each having bottom end pivotally mounted on the surface vehicle for pivoting on a first horizontal axis, each front support arm having a top end pivotally mounted on the flying vehicle for pivoting on a second horizontal axis;

first and second rear support arms each having bottom ends pivotally mounted to the surface vehicle aft of the first and second front support arms for pivoting on a third horizontal axis, each rear support arm having a top end pivotally mounted on the flying vehicle for pivoting on a fourth horizontal axis;

first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;

wherein the first, second, and third horizontal axes are parallel.

4. A recreational vehicle comprising:

a surface vehicle having drive means for propulsion along a generally flat surface;

a flying vehicle including a wing having plural flaps; and linkage means for coupling the flying vehicle to the surface vehicle and for automatically and simultaneously adjustably limiting an angle of attack of the wing and an angle of flap deflection, the linkage means comprising first and second front support arms each having bottom ends pivotally mounted on the surface vehicle for pivoting on a first horizontal axis, each front support arm having a top end pivotally mounted on the flying vehicle for pivoting on a second horizontal axis;

first and second rear support arms each having bottom ends pivotally mounted to the surface vehicle aft of the first and second front support arms for pivoting on a third horizontal axis, each rear support arm having a top end pivotally mounted on the flying vehicle for pivoting on a fourth horizontal axis;

first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;

further including a mounting platform attached to the surface vehicle through a pivot and a suspension assembly, the first and second front support arms being attached to the platform.

5. A recreational vehicle comprising:

a surface vehicle having drive means for propulsion along a generally flat surface;

a flying vehicle including a wing having plural flaps; and linkage means for coupling the flying vehicle to the surface vehicle and for automatically and simultaneously adjustably limiting an angle of attack of the wing and an angle of flap deflection, the linkage means comprising first and second front support arms each having bottom ends pivotally mounted on the surface vehicle for pivoting on a first horizontal axis, each front support arm having a top end pivotally mounted on the flying vehicle for pivoting on a second horizontal axis;

first and second rear support arms each having bottom ends pivotally mounted to the surface vehicle aft of the first and second front support arms for pivoting on a third horizontal axis, each rear support arm having a top end pivotally mounted on the flying vehicle for pivoting on a fourth horizontal axis;

first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;

wherein the first and second front support arms are nonparallel to each other when in a vertical position, and wherein the first and second rear support arms are nonparallel to each other when in a vertical position.

6. A recreational vehicle comprising:

a surface vehicle having drive means for propulsion along a generally flat surface;

a flying vehicle including a wing having plural flaps; and linkage means for coupling the flying vehicle to the surface vehicle and for automatically and simultaneously adjustably limiting an angle of attack of the wing and an angle of flap deflection, the linkage means comprising first and second front support arms each having bottom ends pivotally mounted on the surface vehicle for pivoting on a first horizontal axis, each front support arm having a top end pivotally mounted on the flying vehicle for pivoting on a second horizontal axis;

first and second rear support arms each having bottom ends pivotally mounted to the surface vehicle aft of the first and second front support arms for pivoting on a third horizontal axis, each rear support arm having a top end pivotally mounted on the flying vehicle for pivoting on a fourth horizontal axis;

first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;

wherein the arms and the first, second and third horizontal axes satisfy one of the following relationships:

(a)
$H(R) > H(F)$,
$D(F \text{ to } R) = D(F_i \text{ to } R_i)$, and
$L(R) < L(F)$;

(b)
$H(R) = H(F)$,
$D(F \text{ to } R) < D(F_i \text{ to } R_i)$, and

L(R)>L(F);
(c)
H(R)>H(F);
D(F to R)<D(Fi to R), and
L(R)=L(F);
wherein H(F) and H(R) are respective distances of the first and third horizontal axes above a horizontal reference plane through the surface vehicle, D(F to R) and D(Fi to Ri) are respective distances between the first and third horizontal axes and between the second and fourth horizontal axes, and L(F) is the length of the first and second front arms and L(R) is the length of the first and second rear arms measured between axes, such that an angle, with respect to the surface vehicle, of the flying vehicle about the pitch axis only varies with an altitude of the flying vehicle with respect to the surface vehicle, and the angle decreases as the altitude increases.

7. A recreational vehicle comprising:
- a surface vehicle having a bow and having drive means for propelling the surface vehicle along a generally flat surface;
- a flying vehicle including a wing having plural flaps; and
- linkage means for coupling the flying vehicle to the surface vehicle and for automatically and simultaneously adjustably limiting an angle of attach of the wing and an angle of flap deflection, the linkage means comprising
- a mounting platform pivotally mounted to a suspension assembly attached to the bow of the surface vehicle;
- first and second front support arms each having bottom ends pivotally mounted on the platform for pivoting on a first horizontal axis, each front support arm having a top end pivotally mounted on the flying vehicle for pivoting on a second horizontal axis;
- first and second rear support arms each having bottom ends pivotally mounted to the platform aft of the first and second front support arms for pivoting on a third horizontal axis, each rear support arm having a top end pivotally mounted on the flying vehicle for pivoting on a fourth horizontal axis;
- first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;
- an elongated lever arm attached to the platform extending aft of the platform; and
- an airfoil stabilizer attached to the lever arm aft of the platform.

8. A recreational vehicle comprising:
- a surface vehicle having a bow and having drive means for propelling the surface vehicle along a generally flat surface;
- a flying vehicle including a wing having plural flaps; and
- linkage means for automatically and simultaneously coupling the flying vehicle to the surface vehicle and for adjustably limiting an angle of attack of the wing and an angle of flap deflection, the linkage means comprising
- a mounting platform pivotally mounted to a suspension assembly attached to the bow of the surface vehicle;
- first and second front support arms each having bottom ends pivotally mounted on the platform for pivoting on a first horizontal axis, each front support arm having a top end pivotally mounted on the flying vehicle for pivoting on a second horizontal axis;
- first and second rear support arms each having bottom ends pivotally mounted to the platform aft of the first and second front support arms for pivoting on a third horizontal axis, each rear support arm having a top end pivotally mounted on the flying vehicle for pivoting on a fourth horizontal axis;
- first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;
- an elongated lever arm attached to the platform extending aft of the platform; and
- an airfoil stabilizer attached to the lever arm aft of the platform;
- wherein the first, second, and third horizontal axes are parallel.

9. A recreational vehicle comprising:
- a surface vehicle having a bow and having drive means for propelling the surface vehicle along a generally flat surface;
- a flying vehicle including a wing having plural flaps; and
- linkage means for automatically and simultaneously coupling the flying vehicle to the surface of the wing and an angle of flap deflection, the linkage means comprising
- a mounting platform pivotally mounted to a suspension assembly attached to the bow of the surface vehicle;
- first and second front support arms each having bottom ends pivotally mounted on the platform for pivoting on a first horizontal axis, each front support arm having a top end pivotally mounted on the flying vehicle for pivoting on a second horizontal axis;
- first and second rear support arms each having bottom ends pivotally mounted to the platform aft of the first and second front support arms for pivoting on a third horizontal axis, each rear support arm having a top end pivotally mounted on the flying vehicle for pivoting on a fourth horizontal axis;
- first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;
- an elongated lever arm attached to the platform extending aft of the platform; and
- an airfoil stabilizer attached to the lever arm aft of the platform;
- wherein the first and second front support arms are nonparallel to each other when in a vertical position, and wherein the first and second rear support arms are nonparallel to each other when in a vertical position.

10. A recreational vehicle comprising:

a surface vehicle having a bow and having drive means for propelling the surface vehicle along a generally flat surface;

a flying vehicle including a wing having plural flaps; and linkage means for automatically and simultaneously coupling the flying vehicle to the surface vehicle and for adjustably limiting an angle of attack of the wing and an angle of flap deflection, the linkage means comprising a mounting platform pivotally mounted to a suspension assembly attached to the bow of the surface vehicle;

first and second front support arms each having bottom ends pivotally mounted on the platform for pivoting on a front horizontal axis, each front support arm having a top end pivotally mounted on the flying vehicle for pivoting on a second horizontal axis;

first and second rear support arms each having bottom ends pivotally mounted to the platform aft of the first and second front support arms for pivoting on a third horizontal axis, each rear support arm having a top end pivotally mounted on the flying vehicle for pivoting on a fourth horizontal axis;

first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;

an elongated lever arm attached to the platform extending aft of the platform; and an airfoil stabilizer attached to the lever arm aft of the platform;

wherein the first, second, and third horizontal axes are parallel; and wherein the first and second front support arms are nonparallel to each other when in a vertical position, and wherein the first and second rear support arms are nonparallel to each other when in a vertical position.

11. A recreational vehicle comprising:

a surface vehicle having a bow and having drive means for propelling the surface vehicle along a generally flat surface;

a flying vehicle including a wing having plural flaps; and linkage means for automatically and simultaneously coupling the flying vehicle to the surface vehicle and for adjustably limiting an angle of attack of the wing and an angle of flap deflection, the linkage means comprising a mounting platform pivotally mounted to a suspension assembly attached to the bow of the surface vehicle;

first and second front support arms each having bottom ends pivotally mounted on the platform for pivoting on a first horizontal axis, each front support arm having a top end pivotally mounted on the flying vehicle for pivoting on a second horizontal axis;

first and second rear support arms each having bottom ends pivotally mounted to the platform aft of the first and second front support arms for pivoting on a third horizontal axis, each rear support arm having a top end pivotally mounted on the flying vehicle for pivoting on a fourth horizontal axis;

first and second linkage arms each having a bottom linkage arm end affixed to one of the first and second rear support arms at a point below the flying vehicle, the linkage arms and the support arms intersecting at a fixed acute angle, each linkage arm further having a top linkage arm end pivotally mounted to one of the flaps;

an elongated lever arm attached to the platform extending aft of the platform; and an airfoil stabilizer attached to the lever arm aft of the platform; and wherein the arms and the first, second and third horizontal axes satisfy one of the following relationships:

(a)
$H(R) < H(F)$,
$D(F \text{ to } R) = D(Fi \text{ to } Ri)$, and
$L(R) < L(F)$;

(b)
$H(R) = H(F)$,
$D(F \text{ to } R) < D(Fi \text{ to } Ri)$, and
$L(R) > L(F)$;

(c)
$H(R) > H(F)$,
$D(F \text{ to } R) < D(Fi \text{ to } Ri)$, and
$L(R) = L(F)$;

wherein $H(F)$ and $H(R)$ are respective distances of the first and third horizontal axes above a horizontal reference plane through the surface vehicle, $D(F \text{ to } R)$ and $D(Fi \text{ to } Ri)$ are respective distances between the first and third horizontal axes and between the second and fourth horizontal axes, and $L(F)$ is the length of the first and second front arms and $L(R)$ is the length of the first and second rear arms measured between axes, such that an angle, with respect to the surface vehicle, of the flying vehicle about the pitch axis only varies with an altitude of the flying vehicle with respect to the surface vehicle, and the angle decreases as the altitude increases.

* * * * *